United States Patent
Konanur et al.

(10) Patent No.: US 9,935,691 B2
(45) Date of Patent: Apr. 3, 2018

(54) ANTENNA CONFIGURATION FOR DYNAMIC RE-DISTRIBUTION OF MAGNETIC FIELDS

(71) Applicant: Intel Corporation, Santa Clara, CA (US)

(72) Inventors: Anand S. Konanur, Sunnyvale, CA (US); Songnan Yang, San Jose, CA (US); Kwan Ho Lee, Mountain View, CA (US); Ulun Karacaoglu, San Diego, CA (US); Farid Adrangi, Lake Oswego, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/134,080

(22) Filed: Dec. 19, 2013

(65) Prior Publication Data
US 2015/0180552 A1    Jun. 25, 2015

(51) Int. Cl.
*H04B 5/00* (2006.01)
*H01Q 7/00* (2006.01)
*H01Q 1/22* (2006.01)
*H01Q 21/00* (2006.01)

(52) U.S. Cl.
CPC ......... *H04B 5/0087* (2013.01); *H01Q 1/2208* (2013.01); *H01Q 7/00* (2013.01); *H01Q 7/005* (2013.01); *H01Q 21/00* (2013.01); *H04B 5/0031* (2013.01)

(58) Field of Classification Search
CPC .................................................... H04B 5/0087
USPC ........................................................ 455/41.1
See application file for complete search history.

(56) References Cited

U.S. PATENT DOCUMENTS

| | | | | |
|---|---|---|---|---|
| 5,557,293 A * | 9/1996 | McCoy | ........ | H01Q 1/242 343/702 |
| 2010/0164829 A1* | 7/2010 | Pulimi | ........ | H01Q 1/243 343/846 |
| 2012/0145794 A1* | 6/2012 | Mieslinger | ....... | G06K 19/07749 235/488 |
| 2013/0112754 A1* | 5/2013 | Ikemoto | ......... | G06K 7/10336 235/488 |
| 2013/0194155 A1* | 8/2013 | Kuroda | ........ | H01C 27/00 343/867 |
| 2015/0091502 A1* | 4/2015 | Mukherjee | .......... | H02J 7/025 320/108 |
| 2015/0155737 A1* | 6/2015 | Mayo | ............ | H02J 7/025 320/108 |

FOREIGN PATENT DOCUMENTS

| | | |
|---|---|---|
| CN | 102265480 A | 11/2011 |
| CN | 103219808 A | 7/2013 |
| CN | 103427879 A | 12/2013 |
| WO | 2013/095458 A1 | 6/2013 |

OTHER PUBLICATIONS

Office Action received for Chinese Patent Application No. 201410858177.5, dated Jan. 26, 2017, 21 pages of Chinese Office Action including 13 pages of English Translation.

* cited by examiner

*Primary Examiner* — Raj Chakraborty
(74) *Attorney, Agent, or Firm* — Schiff Hardin LLP

(57) ABSTRACT

Described herein are architectures, platforms and methods for dynamic re-distribution of magnetic fields in a device during near field communication (NFC) related functions or transactions and/or wireless charging.

20 Claims, 6 Drawing Sheets

ANTENNA CONFIGURATION FOR DYNAMIC RE-DISTRIBUTION OF MAGNETIC FIELDS

BACKGROUND

Typical wireless communication and power transfer schemes in use today employ inductive coupling between a resonant primary coil antenna and a resonant secondary coil antenna. For example, wireless communication includes near field communications (NFC) related functions or Europay, MasterCard and Visa (EMVCo) based contactless payment and wireless charging. A common issue seen in these systems is a non-uniform nature of induced voltage in the secondary coil antenna as it is moved with various x-y offsets at a fixed distance z from the primary coil antenna. Moreover, the nature of the non-uniformity is a function of the size of the secondary coil antenna relative to the primary coil antenna.

It is noted that the above non-uniformity may be particularly pronounced when the primary and the secondary coil antennas are identical in size and geometry. This configuration leads to a high degree of coupling between the coils antennas, leading to a splitting of modes (in the frequency domain), where the resonant frequencies of the combined coupling coil antennas are different from the resonant frequency of the individual coil antenna, which happens to be the driving frequency of signal in the primary coil antenna.

The non-uniformity further results in an unpredictable user experience and is best exemplified in contactless credit card reading performance. For example, the contactless credit card may have coil strips or coil antenna that cover a) all area of the card, b) half area of the card, or c) quarter area of the card. In addition, the center of the embedded coil strips in the credit card typically does not coincide with a geometric center of the credit card making it hard for the user to find the best location to tap at a reader and elicit a response.

The user's difficulty is also reflected in the challenge faced in passing EMVCo Contactless Payment Certification by reading a diverse set of representative cards at various orientations and positions. Failing to read the cards at any of the defined positions/orientations results in a certification failure. Hence, the certification is gated by the performance at the worst location in the operating volume. Therefore, having a very high field at one point, followed by a point with a weak field nearby is undesirable.

In wireless charging scenario, there is also a need to carefully align a wireless charging device on the charging mat so as to maximize the power transfer. Therefore, there is a need for a design to provide the same level of coupling over a wide x-y area for a given coupling secondary coil antenna.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for dynamic re-distribution of magnetic fields during NFC related functions or transactions.

In an exemplary implementation, a primary coil antenna includes a continuous loop of coil antenna line that forms a spiral coil antenna with an outer loop and an inner loop. In this implementation, a loop array is disposed on top of the primary coil antenna in order to redistribute magnetic fields that may be generated from the primary coil antenna. For example, the loop array is a separate component that is positioned within an area defined by the inner loop of the primary coil antenna.

When a current excites the primary coil antenna, the primary coil antenna radiates magnetic fields that may cut through the loop array. In an exemplary implementation, the array includes multiple individual loop antennas that are configured to resonate at or near an operating frequency of the primary coil antenna.

At or near the operating frequency of the primary coil antenna, the loop array redistributes the cutting magnetic fields to another coupling coil antenna or a secondary coil antenna. This re-distribution is due to in-phase nature of induced currents in the set of loop array.

As an example of present implementations herein, a position or location of the coupling secondary coil antenna is detected with reference to present position or location of the primary coil antenna. For example, electric field strength due to mutual induction between the primary and secondary coil antennas is measured. In this example, the measured electric field strength is utilized to determine position of the coupling secondary coil antenna.

In response to the detected position or location of the coupling secondary coil antenna, some or all of the multiple individual loop antennas in the loop array are activated to perform the re-distribution of the magnetic fields.

Figure 1:
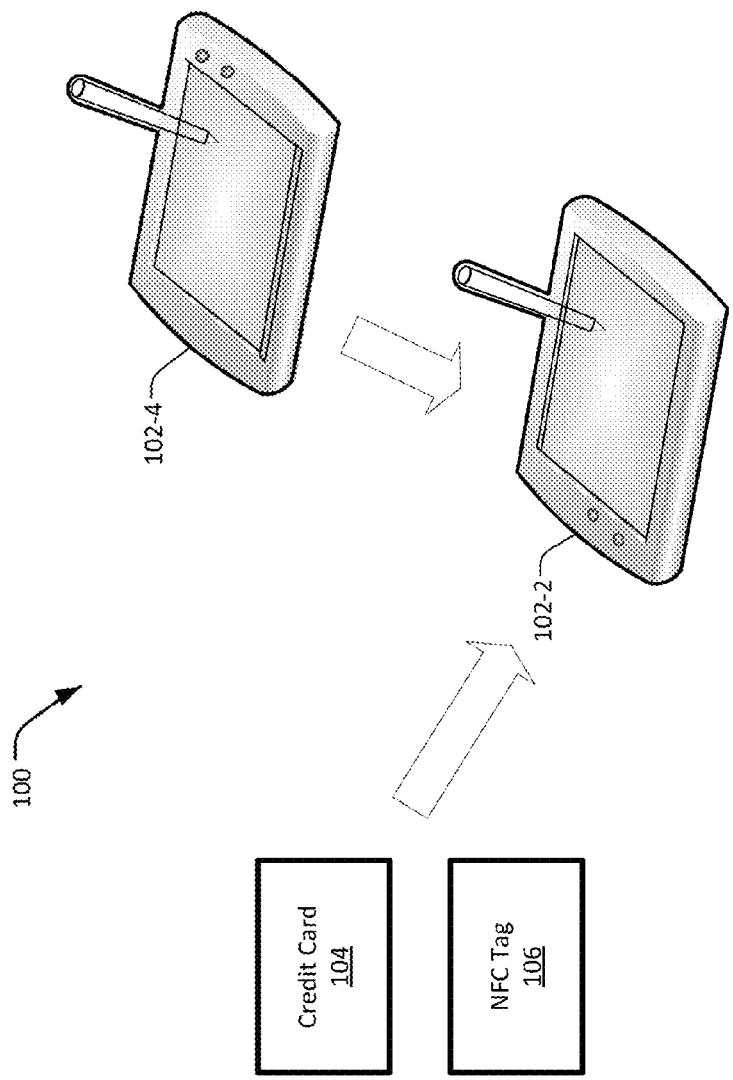
FIG. 1 is an example scenario illustrating near field communication (NFC) coupling arrangement to implement dynamic re-distribution of magnetic fields from a portable device during NFC related functions or transactions.

FIG. 1 is an example scenario 100 that illustrates NFC coupling arrangement to implement dynamic re-distribution of magnetic fields from a portable device during NFC related functions or transactions. Scenario 100 may include a portable device 102-2 that is in near field coupling arrangement with a credit card 104 (e.g., payment transactions) or an NFC tag 106 (e.g., tag reading). Furthermore, the scenario 100 shows the portable device 102-2 to be in near field coupling arrangement with another portable device 102-4 (e.g., NFC communications).

The portable devices 102 may include, but are not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. Furthermore, the portable devices 102 may each include a primary coil antenna (not shown) that is utilized for the NFC related functions or transactions.

As an example of present implementation herein, the portable device 102-2 is utilized for payment transactions (e.g., EMVco transactions) with the credit card 104. In this example, the portable device 102-2 establishes near field coupling with the credit card 104 by positioning secondary coil strips (not shown) of the credit card 104 at a certain distance and direction to the primary coil antenna of the portable device 102-2. At this certain distance, a principle of mutual induction between the primary coil antenna and the secondary coil strips facilitates data communications between the credit card 104 and the portable device 102-2.

Similarly, the NFC tag 106 or the portable device 102-4 may establish near field coupling arrangement with the portable device 102-2 in the same manner described above. For purposes of illustration, the NFC antenna of the portable device 102-2 is hereinafter referred to as the primary coil antenna while the secondary coil strips of the credit card 104 and the NFC tag 106, and the coil antenna of the portable device 102-4 are hereinafter referred to as the secondary coil antennas.

For example, the secondary coil antenna of the NFC tag 106 is positioned and aligned with respect to the primary coil antenna of the portable device 102-2 during the NFC tag reading. The secondary coil antenna of the NFC tag 106 may include different shapes and sizes as compared to the primary coil antenna of the portable device 102-2.

Regardless of the difference in shape and sizes between these primary and the secondary coil antennas, a set of loop arrays (not shown) is disposed on top of the primary coil antenna of the portable device 102-2 to facilitate re-distribution of the magnetic fields from the primary coil antenna. The re-distribution of the magnetic fields increases efficiency of data communications (e.g., tag reading) between the NFC tag 106 and the portable device 102-2.

In another example, the portable device 102-4 may establish near field communications with the portable device 102-2 by positioning and aligning their secondary and primary coil antennas, respectively. In this example, the loop arrays—that may be disposed on top of the primary and/or the secondary coil antennas—may facilitate the flattening of the magnetic fields during the NFC communications between the portable devices. The loop arrays, as further described below, is a separate circuit board that includes miniaturized multiple loop array coils (i.e., miniaturized coil antenna) with individual capacitors.

Figure 2:
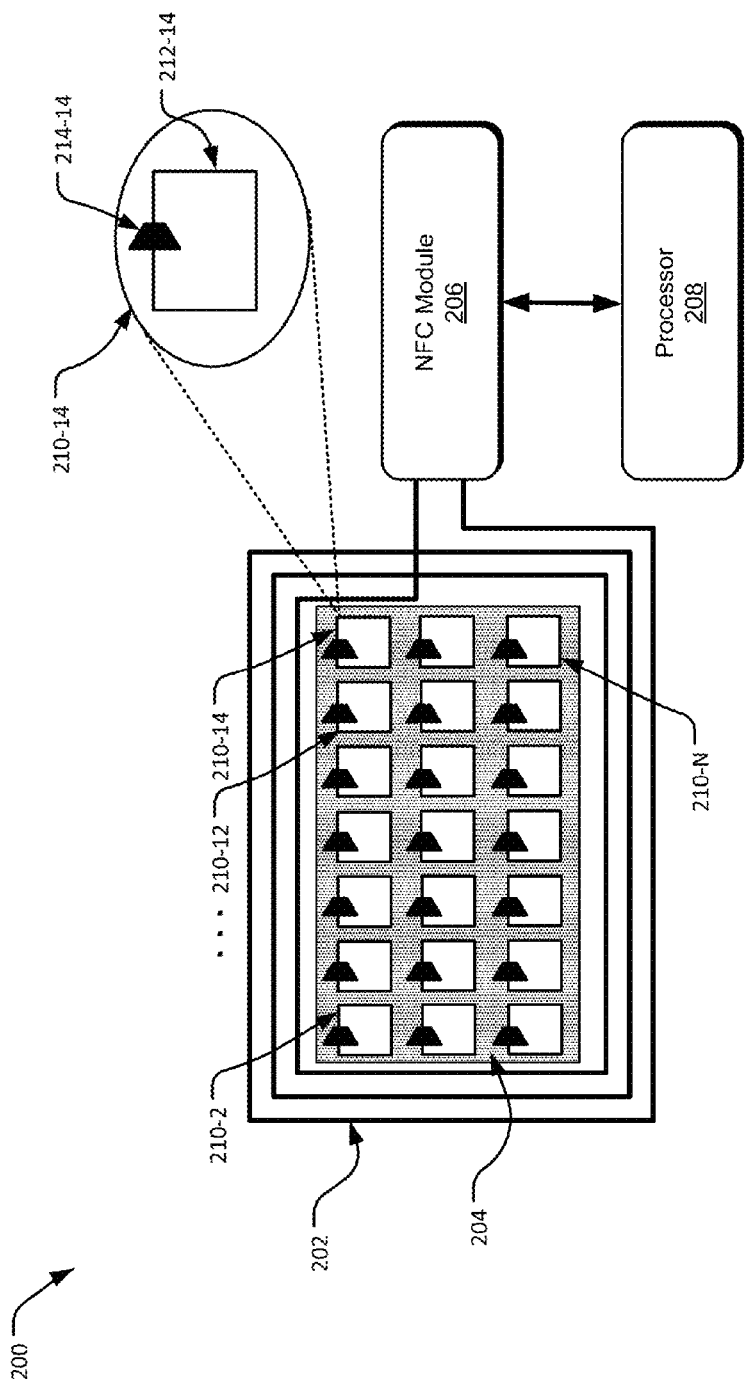
FIG. 2 is an example apparatus that is configured to implement dynamic re-distribution of magnetic fields during near field communication (NFC) related functions or transactions.

FIG. 2 illustrates an example apparatus 200 that is configured to implement dynamic re-distribution of the magnetic fields during near field coupling transactions. The apparatus 200, for example, is integrated to the portable device 102-2. As shown, the apparatus 200 includes a primary coil antenna 202, a loop array 204, an NFC module 206 and one or more processors 208. Furthermore, the loop array 204 includes individual loop antennas 210-2, 210-4, . . . 210-N. Furthermore still, each of these individual loop antennas 210 is made up of a loop array coil 212 and terminated and or connected in parallel to a capacitor 214.

As an example of present implementations herein, the primary coil antenna 202 includes a continuous loop of coil antenna that is utilized by the portable device 102-2 during the EMVCo transactions or NFC communications as described above. The primary coil antenna 202 may include different shapes, sizes, and may involve multiple number of loops. Furthermore, the primary coil antenna 202 may be configured to resonate at an operating frequency of about 13.57 MHz during near field communications.

As shown, the multiple number of loops of the primary coil antenna 202 may include an innermost loop and an outermost loop. The loop array 204, which is a separate circuit board from the primary coil antenna 202, may be installed or disposed on top of a plane that is defined by the innermost loop. For example, the loop array 204 is disposed by a few millimeters (e.g., 2 mm) on top of the innermost loop plane of the primary coil antenna 202. In this example, the loop array 204 operates separately and independently from the operation of the primary coil antenna 202.

Furthermore, the primary coil antenna 202 is a prime radiator of magnetic fields while the loop array 204 may be configured to redistribute the magnetic fields from the primary coil antenna 202 to the coupling secondary coil antennas. The coupling secondary coil antennas may be from the credit card 104, NFC tag 106, or of the portable device 102-4.

In an exemplary implementation such as when the primary coil antenna 202 is excited i.e., current is flowing through the continuous loop of coil antenna, the primary coil antenna 202 radiates the magnetic fields that may cut through the loop array 204. The radiated magnetic fields are then re-distributed by the miniaturized individual loop antennas 210 that are disposed on top of the set of loop array 204.

In an exemplary implementation, the radiated magnetic fields may induce currents to the loop array coil 212 of the individual loop antenna 210. In this implementation, the capacitor 214 is configured or adjusted to set a resonant frequency of the individual loop antenna 210 at or near the operating frequency of the primary coil antenna 202. For example, if the primary coil antenna 202 is operating at 13.56 MHz, then the individual loop antenna 210 is configured to resonate at about 13.40 MHz.

Each individual loop antenna 210 includes the loop array coil 212 (i.e., smaller version of the primary coil antenna 202) with the terminating capacitor 214. The loop array coil 212 may include different shapes such as a square, rectangle, circular, etc. and they are distributed equally or randomly within the plane (i.e., circuit board) of the set of loop array 204. This equal or random distribution may require different adjustments of the terminating capacitors 214 in order to resonate at or near the operating frequency of the primary coil antenna 202. For example, the loop array coils 212 that are positioned near the center of the innermost loop of the primary coil antenna 202 have different impedance adjustment as compared to the loop array coils 212 that are positioned along outside perimeter of the set of loop array 204.

In other exemplary implementations, the adjustments of the loop array coils 212 to resonate at or near the operating frequency may be based upon the position or location of the coupling secondary coil antenna as further discussed below.

At or near the operating resonant frequency of 13.56 MHz, the individual loop antenna 210 may evenly re-distribute the magnetic fields to the coupling secondary coil antennas such as that of the credit card 104 or the NFC tab 106. The re-distribution of the induced magnetic fields may eliminate the need for alignment between the primary and the secondary coil antennas to maximize efficiency during the near field coupling communications.

With continuing reference to FIG. 2, the NFC module 206 may include a transceiver circuitry that processes electrical signals (not shown) that may be received through the primary coil antenna 202. For example, the NFC module 206 may be used to provide tuning to the primary coil antenna 202 for maximum power transfer during transmit or receive operations. In an implementation, the NFC module 206 may be integrated with the primary coil antenna 202 and/or the processor 208 to form a single module. In other implementation, the primary coil antenna 202 and the set of loop array 204 may also form a single module.

In an exemplary implementation, the processor 208 may be configured to detect position or location of the secondary coil antennas (e.g., coil of the credit card 104) based from mutual interaction of magnetic fields between the primary and the secondary coil antennas. Based from this detection, the processor 208 facilitates the activation of the loop antennas 210 that are located within an area defined by the detected position or location the secondary coil antennas. In other words, the processor 208 is configured to control which of the loop antennas 210 in the set of loop array 204 to turn ON or to turn OFF. In other implementations, the detection is based upon change in capacitance such as when the credit card 104 or the NFC tag 106 is in physical contact with a touch detector of the portable device 102-2.

Figure 3:
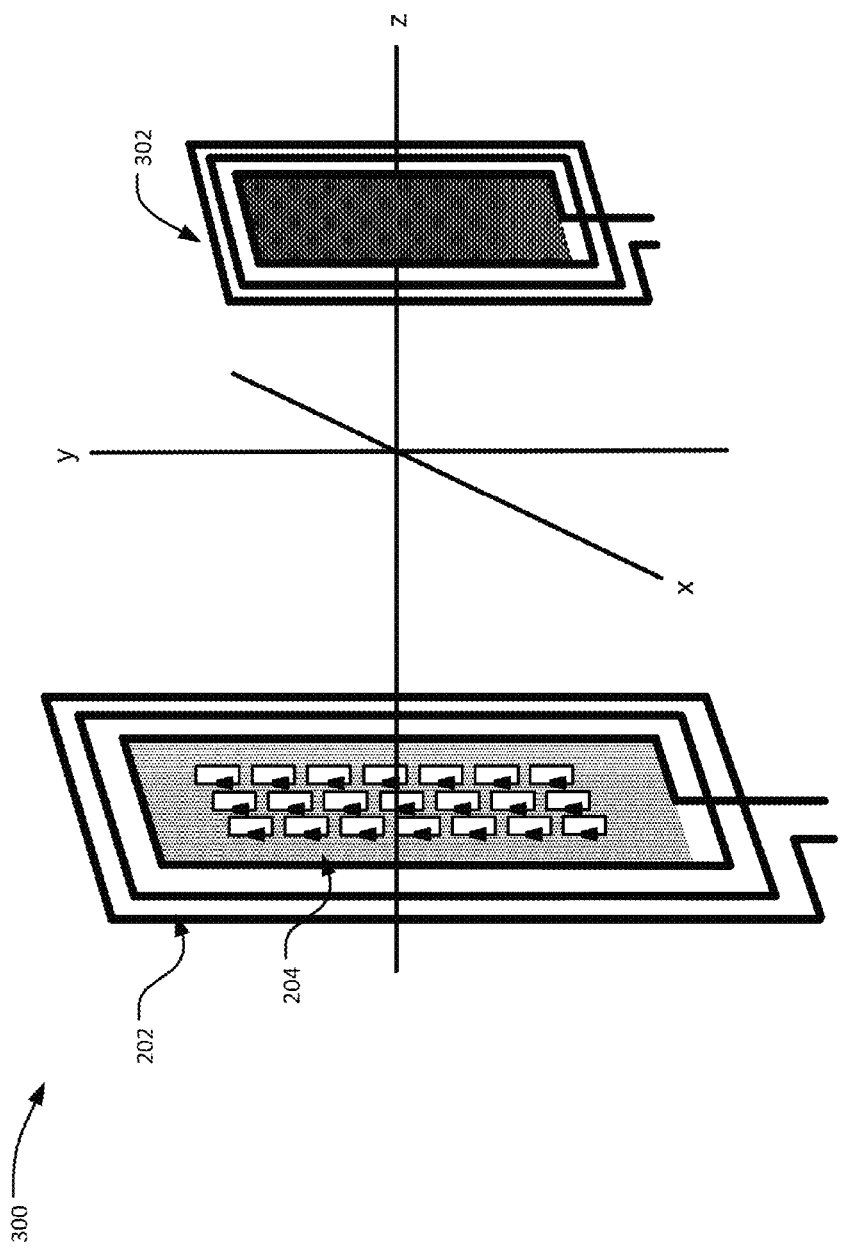
FIG. 3 is an example scenario that illustrates mutual interaction between primary and the secondary coil antennas during near field communication (NFC) related functions or transactions.

FIG. 3 illustrates an example scenario 300 that illustrates mutual interaction between the primary and the secondary coil antennas during the near field coupling transactions. As shown, the scenario 300 shows the primary coil antenna 202, the set of loop array 204, and a secondary coil antenna 302. The secondary coil antenna 302, for example, represents the coil antenna strips of the credit card 104 or the NFC tag 106, or the NFC antenna of another portable device 102.

As shown, the secondary coil antenna 302 of the portable device 102-4 is positioned in the direction of the primary coil antenna 202 during NFC communications. For example, a current flows and energizes the primary coil antenna 202 and thereby creates magnetic fields that may cut into loop array coils 212 of the set of loop array 204. In this example, the capacitors 214 of the loop array coils 212 are individually configured and adjusted to facilitate resonance of the loop arrays 212 at or near the operating frequency of the primary coil antenna 202. At this set-up, the re-distributed magnetic fields may allow the secondary coil antenna 302 to move in different directions (e.g., x, y, or z direction) and is not limited to maintaining a specific alignment with the primary coil antenna 202 to obtain efficient NFC communication.

In other exemplary implementations, the loop array coils 212 are used as a means to detect location and position of the secondary coil antenna 302. For example, when the secondary coil antenna 302 is placed at a certain alignment with the primary coil antenna 302, different field strengths may be measured among the loop array coils 212 due to mutual induction between the primary and secondary coil antennas. Based from these measured field strengths, the NFC module 206 and/or the processor 208 may be configured to activate the loop array coils 212 that are within an area of strong field strengths. In this manner, power savings is obtained in the portable device 102-2.

Figure 4:
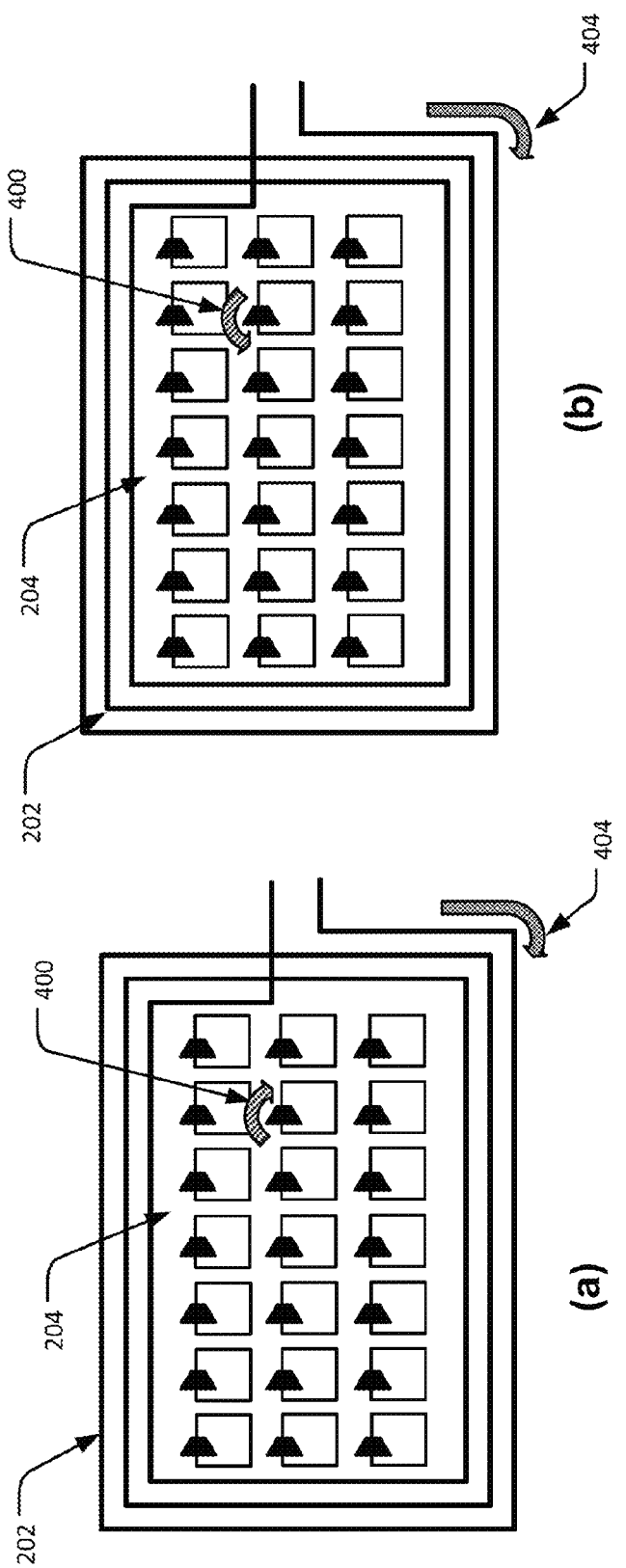
FIG. 4 is a set of loop array with different resonant frequency settings.

FIG. 4 illustrates a loop array with different resonant frequency settings.

As shown in FIG. 4 (a), the loop array 204 is set to resonate at or near the 13.56 MHz operating frequency of the primary coil antenna 202. For example, the loop array coils 212 is set to resonate at around 13.40 MHz. In this example, the induced current 400 at this resonant frequency flows in the same direction as energizing current 402 in the primary coil antenna 202. Thus, the resulting magnetic fields are in phase and the magnetic fields may be re-distributed by the loop array 204 to the coupling secondary coil antennas. Normally when the loop array 204 is not tuned, currents are induced in the loop array 204 that oppose the cause of the induced currents per Lenz's Law. However, when the parasitic loop array is tuned to resonate at a frequency slightly below the frequency of the primary coil, then beyond resonance there is a 180 degree phase lag between the induced voltage and the induced current that effectively reverses the direction of induced current in the parasitic loop array. Thus the induced current has the same sense as the driving current in the large primary coil and contributes constructively to redistributing the field.

As opposed to FIG. 4 (b), the set of loop array 204 is not set to resonate at or near the 13.56 MHz operating frequency of the primary coil antenna 202. For example, the terminating capacitors 214 are not adjusted to configure the loop array coils 212 to resonate at around 13.40 MHz. In this example, the induced current 400 may flow in the opposite direction as that of the energizing current 402 in the primary coil antenna 202. Thus, the resulting magnetic fields may include out-of-phase currents that cancel out, and there may be small or no beneficial re-distribution of the magnetic fields to the coupling secondary coil antennas.

Figure 5:
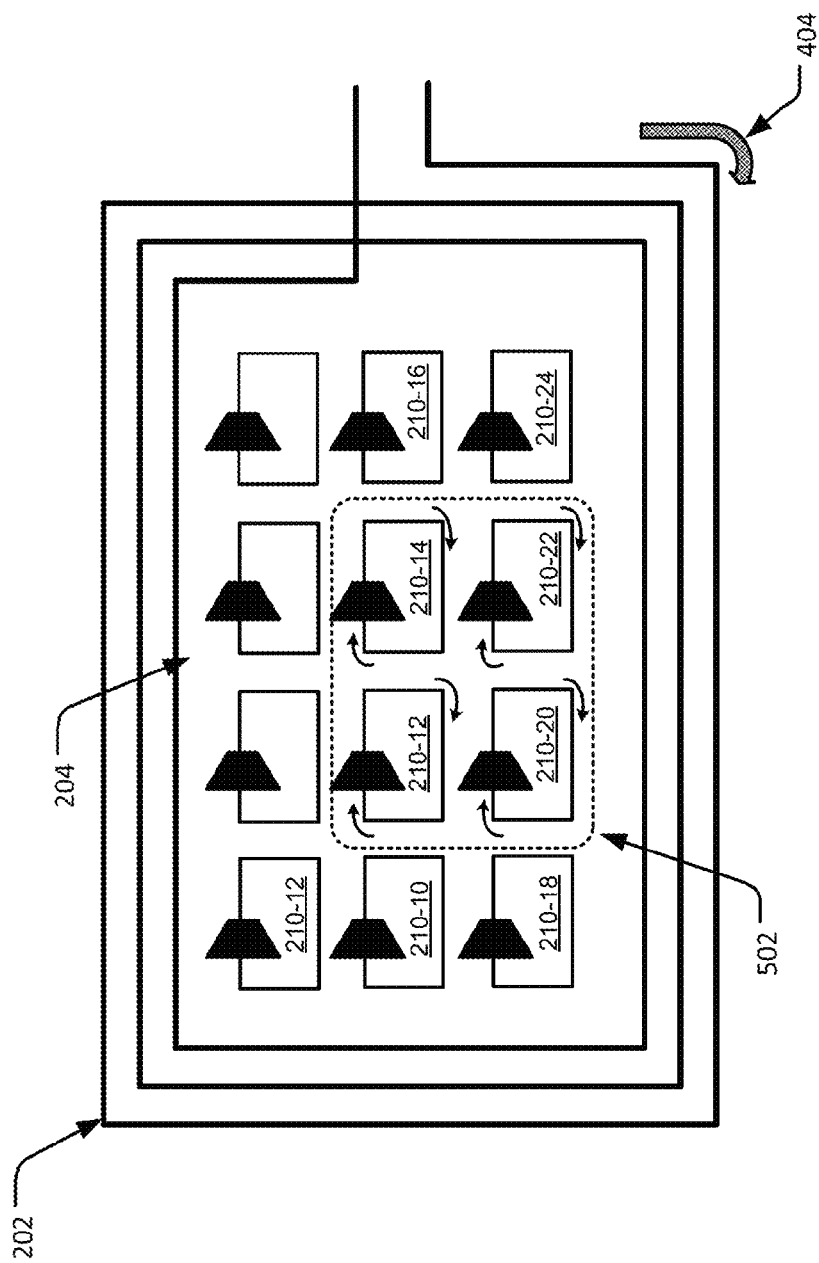
FIG. 5 illustrates a loop array with a limited number of activated loop array coils based upon a position or location of a coupling secondary coil antenna

FIG. 5 illustrates a loop array with a limited number of activated loop array coils based upon a position or location of the coupling secondary coil antenna.

As discussed above, the position or location of the coupling secondary coil antenna 302 may be detected based upon field strength due to mutual induction between the primary and secondary coil antennas. Upon detection of the location and/or position of the coupling secondary coil antenna 302, the NFC module 206 and/or the processor 208 may be utilized to activate the loop array coils 212 that are within a certain field strength of the coupling secondary coil antenna 302. The activation of the loop array coils 212, for example, provides adjustments of their respective terminating capacitors 214 in order to resonate at or near the operating resonant frequency of the primary coil antenna 202.

As shown in FIG. 5, a region 502 illustrates a particular area where the field strength of the coupling secondary coil antenna 302 is detected. In this scenario, the processor 208 may activate the loop coil arrays 210-12, 210-14, 210-20, and 210-22 of the set of loop array 204. The limited activation of the loop coil arrays 210 in the set of loop array 204 may provide power savings to the driving device or sink device.

Figure 6:
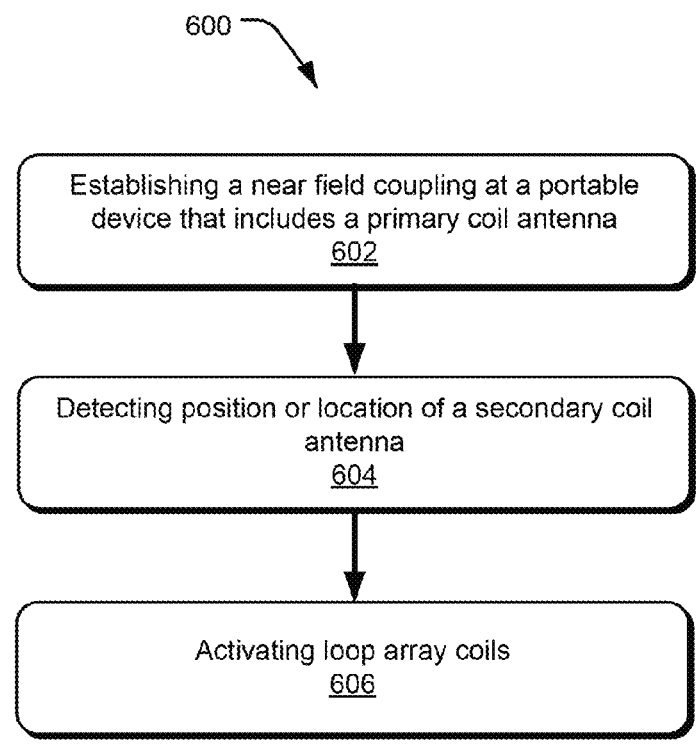
FIG. 6 is an example process chart illustrating an example method for dynamic re-distribution of magnetic fields during near field communications (NFC) related functions or transactions.

FIG. 6 shows an example process chart 600 illustrating an example method for dynamic re-distribution of magnetic fields during NFC related functions or transactions. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, establishing near field coupling by a primary coil antenna is performed. For example, an exciting current is flowing through the primary coil antenna 202 of the portable device 102-2. In this example, the primary coil antenna 202 will be radiating magnetic fields as a result.

At block 604, detecting position of a secondary coil antenna is performed. For example, the secondary coil antenna 302 is engaging in an NFC communication with the primary coil antenna 202. In this example, the secondary coil antenna 302 is placed closer or in near contact with the primary coil antenna 202. In an implementation, the loop array 204 may be used to detect locations of the secondary coil antenna 302. For example, the multiple loops of the primary coil antenna 202 and/or the loop array coils 212 may react to presence of mutual induction that is generated by the coupling secondary coil antenna 302. In this example, the primary coil antenna 202 and/or the loop array coils 212 may facilitate detection of electric field strength that is coming from the direction of the coupling secondary coil antenna 302.

At block 606, activating loop array coils is performed. In response to the detected location of the coupling secondary coil antenna 302, the loop array coils 212 that are within vicinity of the detected location are activated. For example, these loop array coils 212 are configured to resonate at or near the operating frequency of the primary coil antenna 202.

The following examples pertain to further embodiments:

Example 1 is a device comprising: one or more processors; a near field communication (NFC) module coupled to the one or more processors; a primary coil antenna coupled to the NFC module and the one or more processors, the primary coil includes a continuous loop of coil antenna line; a loop array coupled to the NFC module and the one or more processors, the loop array disposed on top of the primary coil antenna, the loop array includes a plurality of loop antennas configured to resonate at or near an operating frequency of the primary coil antenna.

In Example 2, the device as recited in Example 1, wherein the one or more processors are configured to turn ON a plurality loop antennas based upon a detected location of a coupling secondary coil antenna, the detection includes measuring field strength due to mutual induction between the primary coil antenna and the coupling secondary coil antenna.

In Example 3, the device as recited in Example 1, wherein the NFC module is configured to facilitate current that excites the primary coil antenna, wherein magnetic fields from the primary coil antenna induce currents to the individual loop antennas of the loop array.

In Example 4, the device as recited in any of Examples 1, 2 or 3, wherein the primary coil antenna is configured to have the operating frequency at or near 13.56 MHz.

In Example 5, the device as recited in Examples 1, 2 or 3 further comprising a capacitor that is connected to each of the plurality of loop antennas, wherein the capacitor is adjusted to resonate each of the plurality of loop antennas at or near the operating frequency of the primary coil antenna.

In Example 6, the device as recited in Examples 1, 2 or 3, wherein the loop array is operated independently from the primary coil antenna.

In Example 7, the device as recited in Examples 1, 2 or 3, wherein each of the plurality of the loop antennas comprises circular, square, or rectangular shapes.

Example 8 is an apparatus comprising: a primary coil antenna; a loop array disposed over the primary coil antenna, the loop array includes a plurality of loop array coils coupled to a plurality of capacitors, wherein the plurality of capacitors are adjusted to resonate the plurality of loop array coils at or near an operating frequency the primary coil antenna.

In Example 9, the apparatus as recited in Example 8, wherein the plurality of loop array coils are activated based upon a detected location of a coupling secondary coil antenna, the detection includes measuring field strength due to mutual induction between the primary coil antenna and the coupling secondary coil antenna.

In Example 10, the apparatus as recited in Example 8, wherein the primary coil antenna is excited with a current to generate magnetic fields, wherein the generated magnetic fields from the primary coil antenna induce currents to the plurality of loop array coils.

In Example 11, the apparatus as recited in Examples 8, 9 or 10 wherein the primary coil antenna is configured to have the operating frequency at or near 13.56 MHz.

In Example 12, the apparatus as recited in Examples 8, 9 or 10 wherein the primary coil antenna and the loop array form a single module.

In Example 13, the apparatus as recited in Examples 8, 9 or 10 wherein the loop array is operated independently from the primary coil antenna.

In Example 14, the apparatus as recited in Examples 8, 9 or 10, wherein the plurality of loop array coils comprises circular, square, or rectangular shapes.

Example 15 is a method of dynamic re-distribution of magnetic fields during near field communications (NFC) related functions or transactions in a device, the method comprising: providing near field coupling by a primary coil antenna; detecting position of a coupling secondary coil antenna; in response to detecting the position of the coupling secondary coil antenna, activating a plurality of loop array coils in a loop array disposed over the primary coil antenna, wherein the plurality of loop array coils are configured to resonate at or near an operating frequency the primary coil antenna.

In Example 16, the method as recited in Example 15, wherein the detecting position includes measuring field strength due to mutual induction between the primary coil antenna and the coupling secondary coil antenna.

In Example 17, the method as recited in Example 15, wherein the providing near field coupling includes a current flowing through the primary coil antenna, wherein the current generates magnetic fields that induce current to the plurality of loop array coils.

In Example 18, the method as recited in Examples 15, 16 or 17, wherein the primary coil antenna is configured to have the operating frequency at or near 13.56 MHz.

In Example 19, the method as recited in Examples 15, 16 or 17, wherein the plurality of loop array coils comprises circular, square, or rectangular shapes of coil antenna.

In Example 20, the method as recited in Examples 15, 16 or 17, wherein the plurality of loop array coils are a plurality of terminated individual capacitors configured to adjust resonance frequency of the plurality of loop array coils.

What is claimed is:

1. A device comprising:
   a primary coil antenna including a continuous loop of coil antenna line to form an outermost loop and an innermost loop;
   a loop array including a plurality of loop antennas that are disposed on top of and within an area defined by the innermost loop of the primary coil antenna, wherein each loop antenna of the plurality of loop antennas is operated independently from other of the loop antennas, each loop is configured to have a resonance frequency that is below an operating frequency of the primary coil antenna upon activation;

a near field communication (NFC) transceiver coupled to the primary coil antenna and the loop array, and configured to process signals received through the primary coil antenna; and one or more processors coupled to the NFC transceiver, to the loop array, and to the primary coil antenna, and configured to detect a location of a coupling secondary coil antenna, and selectively activate the plurality of loop antennas based on the detected location of the coupling secondary coil antenna, the selectively activating being to re-distribute a magnetic field from the primary coil antenna based on the detected location.

2. The device as recited in claim 1, wherein the detection of the location includes measuring field strength due to mutual induction between the primary coil antenna and the coupling secondary coil antenna.

3. The device as recited in claim 1, wherein the magnetic field from the primary coil antenna induces currents to the plurality of loop antennas of the loop array.

4. The device as recited in claim 1, wherein the primary coil antenna is configured to have an operating frequency at or near 13.56 MHz.

5. The device as recited in claim 1, further comprising a capacitor that is connected to each of the plurality of loop antennas, wherein the capacitor is adjusted to resonate each of the plurality of loop antennas below the operating frequency of the primary coil antenna.

6. The device as recited in claim 1, wherein the loop array is operated independently from the primary coil antenna.

7. The device as recited in claim 1, wherein each of the plurality of the loop antennas comprises a circular, square, or rectangular shape.

8. An apparatus comprising:
a primary coil antenna that includes an outermost loop and an innermost loop; and
a loop array including a plurality of loop array coils that are disposed over and within an area defined by the innermost loop, wherein each loop array coil of the plurality of loop array coils is operated independently from other of the loop array coils, and each loop array coil upon activation is adjusted to resonate below an operating frequency of the primary coil antenna, the plurality of loop array coils being selectively activated based on a detected location of a secondary coil antenna to re-distribute a magnetic field from the primary coil antenna based on the detected location.

9. The apparatus as recited in claim 8, wherein the detection of the location of the secondary coil antenna includes measuring field strength due to mutual induction between the primary coil antenna and the coupling secondary coil antenna.

10. The apparatus as recited in claim 8, wherein the primary coil antenna is configured to be excited with a current to generate the magnetic field, wherein the generated magnetic field from the primary coil antenna includes currents to the plurality of loop array coils.

11. The apparatus as recited in claim 8, wherein the primary coil antenna is configured to have an operating frequency at or near 13.56 MHz.

12. The apparatus as recited in claim 8, wherein the primary coil antenna and the loop array form a single circuitry.

13. The apparatus as recited in claim 8, wherein the loop array is operated independently from the primary coil antenna.

14. The apparatus as recited in claim 8, wherein the plurality of loop array coils comprises circular, square, or rectangular shapes.

15. A method of dynamic re-distribution of magnetic fields during near field communications (NFC) related functions or transactions in a device, the method comprising:
providing near field coupling by a primary coil antenna having an outermost loop and an innermost loop;
detecting a location of a coupling secondary coil antenna; and
in response to detecting the location of the coupling secondary coil antenna, selectively activating a plurality of loop array coils disposed over and within an area defined by the innermost loop, wherein each loop array coil of the plurality of loop array coils is operated independently from other of the loop array coils, and each loop array coil is configured to resonate below an operating frequency of the primary coil antenna, the selective activation being to re-distribute a magnetic field from the primary coil antenna based on the detected location.

16. The method as recited in claim 15, wherein the detecting of the location includes measuring field strength due to mutual induction between the primary coil antenna and the coupling secondary coil antenna.

17. The method as recited in claim 15, wherein the providing of the near field coupling includes generating the magnetic field that induces currents to the plurality of loop array coils by exciting the primary coil antenna.

18. The method as recited in claim 15, wherein the primary coil antenna is configured to have an operating frequency at or near 13.56 MHz.

19. The method as recited in claim 15, wherein the plurality of loop array coils comprises circular, square, or rectangular shapes of coil antenna.

20. The method as recited in claim 15, wherein the plurality of loop array coils are a plurality of terminated individual capacitors configured to adjust resonance frequency of the plurality of loop array coils.

* * * * *